July 30, 1963 A. D. BERK ETAL 3,099,805
BIDIRECTIONAL COUPLING BETWEEN WAVEGUIDES VIA TWO
NONRECIPROCAL GYROMAGNETIC COUPLING RODS
Filed Jan. 9, 1956
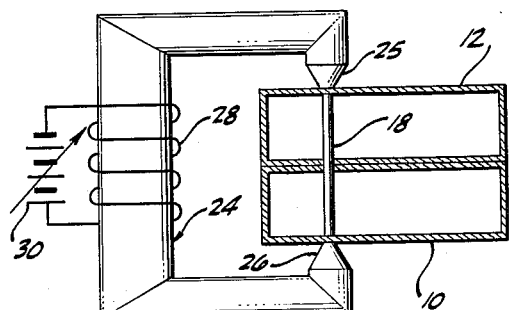
PRIOR ART FIG. 1.
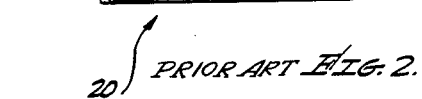
PRIOR ART FIG. 2.
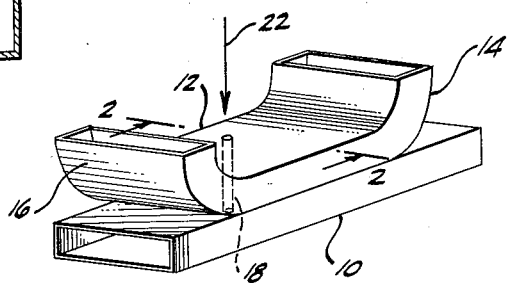
FIG. 3
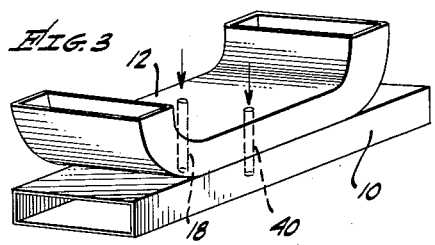
FIG. 4.
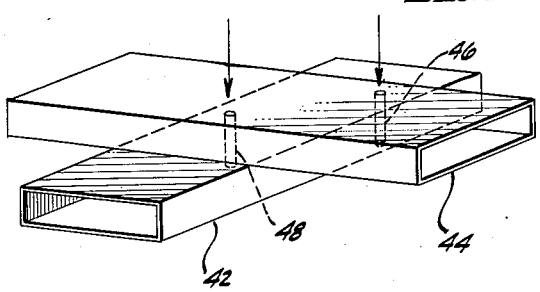
FIG. 5.
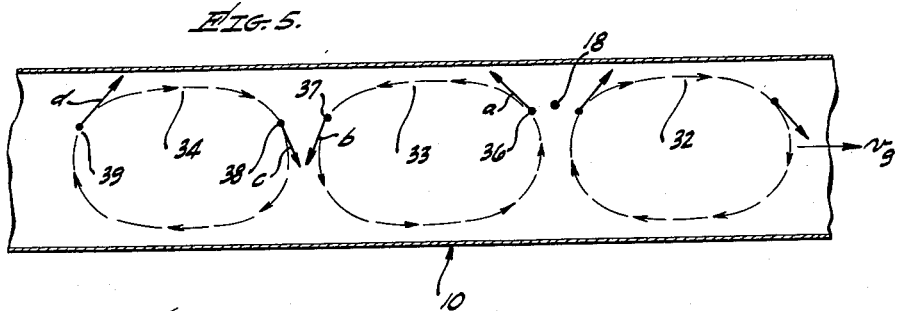
FIG. 6.
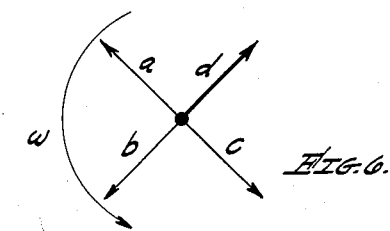
INVENTORS.
ARISTID D. BERK,
ERIC STRUMWASSER,
BY
ATTORNEY.

United States Patent Office 3,099,805
Patented July 30, 1963

3,099,805
BIDIRECTIONAL COUPLING BETWEEN WAVE-GUIDES VIA TWO NONRECIPROCAL GYRO-MAGNETIC COUPLING RODS
Aristid D. Berk and Eric Strumwasser, Los Angeles, Calif., assignors to Hughes Aircraft Company, a corporation of Delaware
Filed Jan. 9, 1956, Ser. No. 557,917
2 Claims. (Cl. 333—24.1)

This invention relates to uni-directional and bi-directional waveguide coupling devices and more particularly to a waveguide coupling device which utilizes the properties of an element composed of a ferrite material for providing either uni-directional or bi-directional variable coupling between a main waveguide and an auxiliary waveguide.

It is generally known that a ferrite material provides a medium throughout which numerous spinning electrons are distributed. These spinning electrons may be considered to be magnetic dipoles. When the ferrite material is immersed in a direct-current magnetic field, the magnetic dipoles are aligned parallel to the magnetic field, i.e., the axes of rotation of the rotating electrons are parallel to the magnetic field. Further, a circularly polarized electromagnetic field that is transverse to the direct-current magnetic field has the effect of rotating the magnetic dipoles about the lines of force of the direct-current magnetic field thereby producing a precession. When the precessional velocity of the magnetic dipoles about the magnetic lines of force is substantially equal to and in the same direction as the rotating magnetic field portion of the electromagnetic wave, a phenomenon occurs that is known as "gyro-resonance." When gyro-resonance exists, the magnetic dipoles tend to precess about the magnetic lines of force at progressively increasing angles and in so doing constitute current flowing in circular paths throughout the medium of the ferrite material.

In accordance with the present invention, a direct-current magnetic field is produced lengthwise through a ferrite rod. A portion of the length of this ferrite rod is immersed in a circularly polarized electromagnetic field whereby so-called "exchange forces," i.e., the dipole-dipole coupling forces couple the magnetic dipoles not in the circularly polarized electromagnetic field to the precessing magnetic dipoles in the circularly polarized field so that they rotate at the same precessional velocity. This rotation constitutes a flow of current along circular paths which may be used to excite the circularly polarized component of an electromagnetic field in the region surrounding the portion of the ferrite material not within the sphere of influence of the original circularly polarized electromagnetic field.

Accordingly, in one embodiment of the present invention the broad side of a rectangular main waveguide is placed adjacent the broad side of a rectangular auxiliary waveguide and a ferrite rod disposed transversely through both the main and auxiliary waveguides at positions approximately midway between the center line and one narrow side of each waveguide. In operation, a direct-current magnetic field of predetermined intensity is maintained lengthwise through the ferrite rod whereby electromagnetic energy being propagated in one direction along the main waveguide in a TE mode is coupled to the auxiliary waveguide and launched therealong in a corresponding direction thereby to provide uni-directional coupling.

In the event that it is desired to have bi-directional coupling between a main and an auxiliary waveguide, it is necessary to dispose two ferrite rods transversely through the waveguides. With a broad side of the main waveguide adjacent to and coextensive with a broad side of the auxiliary waveguide, the two ferrite rods are preferably disposed opposite each other at equal distances from the center lines of the waveguides. Alternatively, if it is desired to dispose the waveguides at an angle with each other, the two ferrite rods should be located along a diagonal of the parallelogram formed by the adjacent areas of the broad sides of the waveguides as well as at equal distances from the center lines. In operation, parallel direct-current magnetic fields suitable for producing gyro-resonance in the ferrite medium at the desired frequency or frequencies of operation are maintained through each of the ferrite rods.

It is therefore an object of the present invention to provide directional coupling from a main waveguide to an auxiliary waveguide.

Another object of the invention is to utilize the characteristics of ferrite material for providing directional coupling of electromagnetic energy between two waveguiding structures.

Still another object of the invention is to provide an improved apparatus incorporating a ferrite rod for directionally coupling electromagnetic energy from a main waveguide to an auxiliary waveguide.

The novel features which are believed to be characteristic of the invention, both as to its organization and method of operation, together with further objects and advantages thereof, will be better understood from the following description considered in connection with the accompanying drawing in which several embodiments of the invention are illustrated by way of example. It is to be expressly understood, however, that the drawing is for the purpose of illustration and description only, and is not intended as a definition of the limits of the invention.

FIG. 1 is a schematic perspective view of one embodiment of the device of the present invention;

FIG. 2 is a cross-sectional schematic view of the device of FIG. 1 together with apparatus for producing a transverse magnetic field;

FIGS. 3 and 4 are perspective views of alternative embodiments of the device of the present invention; and FIGS. 5 and 6 are explanatory diagrams.

Referring now to the drawing, FIG. 1 shows a perspective view of one embodiment of the present invention which comprises a main section 10 of rectangular waveguide through which electromagnetic energy is propagated from a source to a load (not shown), and an auxiliary section 12 of rectangular waveguide to which it is desired to couple a portion of energy from the main waveguide section 10. In accordance with the invention, a length of one of the broad sides of the auxiliary waveguide section 12 is disposed adjacent to and coextensive with an equal length of one of the broad sides of the main waveguide section 10. The extremities of the auxiliary waveguide section 12 are connected to "E-plane" bends 14, 16 to facilitate coupling to and from the section 12.

In accordance with the invention, a ferrite rod 18 is disposed transversely through adjacent broad sides of both the main and the auxiliary waveguide sections 10, 12 intermediate the center line and one side thereof. The ferrite rod 18 is preferably cylindrical and has a diameter of the order of 0.060 inch for the X-band range. Further, in the event that it is desired to have a narrow gyro-resonance range, the rod 18 may be composed, for example, of the ferrite material known commercially as "Ferramic G." On the other hand, if it is desired to have a broad gyro-resonance range to facilitate varying the degree of coupling and to have less critical operation, the rod 18 may be composed of the ferrite material known commercially as "Ferroxcube 106."

An apparatus 20 for producing a variable magnetic field longitudinally through the ferrite rod 18, such as represented by the vector 22, is shown in FIG. 2. The apparatus 20 includes a U-shaped yoke 24 of a ferromagnetic material and having pole pieces 25, 26 disposed opposite the extremities of the ferrite rod 18, as shown in the drawing. A coil 28 is disposed about the yoke 24 and connected across a variable potential source 30. In operation, the potential of source 30 is adjusted to effect a current flow through the coil 28 to produce a magnetic field 22 through the ferrite rod 18 of sufficient intensity to produce gyro-resonance at the frequency of operation.

In the operation of the device of the present invention, electromagnetic energy is propagated through the main waveguide section 10 in the TE mode of propagation. To illustrate more clearly the manner in which the ferrite rod 18 is coupled to the propagated electromagnetic wave by means of the gyro-resonance phenomenon, reference is made to FIGS. 5 and 6. FIG. 5 shows a cross-sectional view taken lengthwise through the main waveguide section 10. Dashed lines 32, 33, 34 represent the magnetic lines of force of the electromagnetic wave propagated through the wave guide section 10. The magnetic lines of force represented by the dashed lines 32, 33 and 34 move through the waveguide section 10 at a velocity known as the group velocity, $V_g$. It is apparent that the ferrite rod 18 will be successively immersed in the portion of the magnetic field passing at the particular time. Therefore, as shown in the figure, the ferrite rod 18 will be successively in magnetic fields which are presently shown at the points 36, 37, 38 and 39 and represented by the vectors $a$, $b$, $c$ and $d$, respectively. Thus, as illustrated in FIG. 6, the magnetic field in the region of the ferrite rod 18 is a radial magnetic field which is rotating at an angular velocity, $\omega$, in the counterclockwise direction, as shown in FIG. 6. That is, the successive appearance of the magnetic fields represented by the vectors $a$, $b$, $c$ and $d$ constitutes a circularly polarized field in the region of the ferrite rod 18.

A direction of current flow through the coil 28 is selected that develops a magnetic field which, in turn, produces a precessional velocity in the same direction as the angular velocity of the rotating magnetic field. Further, the magnitude of the current is adjusted to make the intensity of this magnetic field produce gyro-resonance in the region of the operating frequency. In the case where it is desired to effect variable coupling, the intensity of the direct-current magnetic field 22 is adjusted so that the operating frequency occurs on a slope of the gyro-resonance characteristic rather than at a maximum. For an extremely high rate of change in coupling for changes in the direct-current magnetic field, a ferrite material with a narrow gyro-resonance characteristic is employed such as Ferramic G, as previously mentioned. For a lower rate of change in coupling, on the other hand, Ferroxcube 106 is used for the ferrite rod 18. Under the foregoing circumstances, the wave propagated by the main waveguide section 10 causes magnetic dipoles within the ferrite rod 18 to commence precessing whereby the precessing magnetic dipoles constitute circulating currents within the ferrite material. The exchange forces between the magnetic dipoles within the ferrite material cause the magnetic dipoles along the remainder of the length of the ferrite rod 18 to precess which, in turn, radiates a circularly polarized wave. When the remainder of the length of the ferrite rod 18 is inserted in the auxiliary waveguide section 12, the circularly polarized wave will resolve into a wave propagated in the TE mode in a direction consistent with the direction of the circular polarization. Also, a change in the location of the ferrite rod 18 from one side of the center line of a broad side to the other in the auxiliary waveguide section 12 reverses the direction in which the wave is launched therealong. From the above it is evident that a portion of the electromagnetic energy propagated in one direction by the main waveguide section 10 in the TE mode is coupled to the auxiliary waveguide section 12 and launched in only one direction. Also, since the direction of rotation of the magnetic field in the region of the rod 18 that is associated with electromagnetic energy propagated in the opposite direction by the main waveguide section 10 is opposite to the direction in which the magnetic dipoles tend to precess, energy being propagated in this direction is not coupled to the auxiliary waveguide section 12. Further, the effect of changing the polarity of the direct-current magnetic field through the ferrite rod 18 is to reverse the direction from which energy is coupled from the main waveguide section 10 together with the direction in which the wave is launched along the auxiliary waveguide section 12.

Alternative embodiments of the device of the present invention which effect bi-directional coupling are shown in FIGS. 3 and 4. More particularly, the device of FIG. 3 includes the main waveguide section 10, the auxiliary waveguide section 12, and the ferrite rod 18 of the device of FIG. 1. In addition to the above, the device of FIG. 3 includes an additional ferrite rod 40 disposed symmetrically opposite the ferrite rod 18 with respect to the center line of the waveguide sections 10, 12 and transversely through the adjacent broad sides. In operation, parallel magnetic fields of equal intensity are maintained through the ferrite rods 18, 40 to effect bi-directional coupling between the main and auxiliary waveguide sections 10, 12.

In the device of FIG. 4, on the other hand, the broad side of a main waveguide section 42 is disposed adjacent to and at right angles to a broad side of an auxiliary waveguide section 44. It is noted that the coextensive portions of the adjacent broad sides of the waveguide sections 42, 44 form a square. Ferrite rods 46, 48 are disposed transversely through the adjacent broad sides on a diagonal of this square on opposite sides of and equal distances from the center line of the waveguide sections 42, 44. In operation, magnetic fields are maintained lengthwise through the ferrite rods 46, 48 in the same manner as above to effect bi-directional coupling between the main and auxiliary waveguide sections 42, 44.

What is claimed is:

1. An electromagnetic device comprising a main rectangular waveguiding structure for propagating an electromagnetic wave; an auxiliary rectangular waveguiding structure having a broad side disposed adjacent to and at an angle with a broad side of said main waveguiding structure; first and second thin elongated ferrite rods disposed transversely through matching apertures of said adjacent broad sides along a diagonal of the coextensive areas thereof to extend into both of said waveguiding structures, said first and second ferrite rods being spaced on opposite sides of the mid-point of said diagonal; and means for producing parallel magnetic fields in the same direction lengthwise through said first and second ferrite rods, thereby to effect bi-directional coupling between said main and auxiliary waveguides at frequencies corresponding to gyro-resonance in said first and second ferrite rods.

2. An electromagnetic device comprising a main rectangular waveguiding structure for propagating an electromagnetic wave; an auxiliary rectangular waveguiding structure having a broad side disposed adjacent to and coextensive with a broad side of said main waveguiding structure; a first thin elongated ferrite rod disposed transversely through matching apertures of the adjacent broad sides of said main and auxiliary waveguiding structures intermediate the center line and one side thereof to extend into each waveguiding structure; a second similar ferrite rod disposed through matching apertures of said adjacent broad sides parallel to said first ferrite rod on the side of the center line opposite from said first ferrite rod; and means for producing a magnetic field lengthwise through said first and second ferrite rod in the same direction, whereby bidirectional electromagnetic wave coupling is provided between said main and auxiliary waveguiding structures at frequencies corresponding to gyroresonance in said first and second ferrite rods.

References Cited in the file of this patent

UNITED STATES PATENTS

| | | |
|---|---|---|
| 2,602,859 | Moreno | July 8, 1952 |
| 2,627,573 | Riblet | Feb. 3, 1953 |
| 2,645,758 | Van de Lindt | July 14, 1953 |
| 2,849,684 | Miller | Aug. 26, 1958 |
| 2,849,686 | Turner | Aug. 26, 1958 |
| 2,849,687 | Miller | Aug. 26, 1958 |

FOREIGN PATENTS

| | | |
|---|---|---|
| 64,770 | France | June 29, 1955 |
| | (Addition to No. 1,079,880) | |

OTHER REFERENCES

Damon: "Magnetically Controlled Microwave Directional Coupler," Journal of Applied Physics, vol. 26, No. 10, Oct., 1955.

Belgers et al.: "Gyromagnetic Phenomena Occurring With Ferrites," Phillips Technical Review, vol. 11, No. 11, May, 1950, pages 313–340.

Fox et al.: "Behavior and Applications of Ferrite at Microwave Frequencies," Bell Technical Journal, vol. 34, No. 1, Jan. 1955, pages 5–105.